Figure 1:
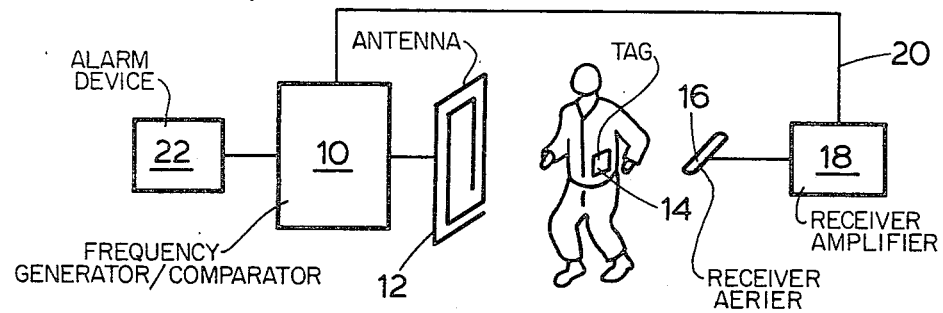

United States Patent [19]

Giles

[11] 4,274,089
[45] Jun. 16, 1981

[54] DETECTION SYSTEM

[75] Inventor: Terence G. Giles, Coulsdon, England

[73] Assignee: U.S. Philips Corporation, New York, N.Y.

[21] Appl. No.: 41,225

[22] Filed: May 21, 1979

[30] Foreign Application Priority Data

May 19, 1978 [GB] United Kingdom ............... 20705/78

[51] Int. Cl.³ .............................................. G08B 13/22
[52] U.S. Cl. .................................... 340/572; 340/539; 340/568
[58] Field of Search ............... 340/539, 552, 562, 567, 340/568, 572, 565, 694

[56] References Cited

U.S. PATENT DOCUMENTS 3,798,642 3/1974 Augenblick et al. ................. 340/572
3,983,552 9/1976 Bakeman, Jr. et al. .............. 340/572

Primary Examiner—Alvin H. Waring

[57] ABSTRACT

A merchandise security system in which a signal having a first frequency is generated and is multiplied or divided by n to provide a signal having a second frequency which is transmitted. A responder circuit in a tag on the merchandise divides or multiplies the transmitted signal by n and transmits it to a receiver where it is compared with the originally generated first frequency and is used to produce an alarm signal.

9 Claims, 9 Drawing Figures

DETECTION SYSTEM

The present invention relates to a detection system comprising an oscillator for generating a signal having a first frequency, a transmitter having an aerial for transmitting an interrogating signal, and a responder movable relative to the aerial having a first resonant circuit for detecting the interrogating signal the responder has a second resonant circuit for transmitting a reply signal. The resonant circuits of the responder are tuned to frequencies mathematically related to each other and are interconnected by a coupling device which activates the second resonant circuit in response to the detection of the interrogating signal. The system further comprising a receiver having an aerial for receiving the reply signal, a detector coupled to a receiver output and an indicator coupled to a detector output for signalling the presence of a responder.

Such detection systems have particular application to merchandise security systems, access control to buildings, to installations or to car parks, stock control, baggage sorting or cattle encoding.

A system as described above is disclosed in the British patents Nos. 1,187,130 and 1,427,920.

A responder circuit is attached to an article, a vehicle or a card carried by a person and will be taken through a doorway or gateway. In this gateway one or more antennae have been arranged transmitting an interrogating signal from a transmitter. A responder present in this gateway will receive the interrogating signal and thereupon will transmit a reply signal which is picked up by an antenna connected to a receiver. A detector circuit signalises the presence of a responder and, as the case may be, which kind of responder is present if use is made of encoding and decoding circuits.

The interrogating signal and the reply signal have different frequencies to avoid interference problems. The two frequencies are mathematically related by means of frequency multiplying or to frequency dividing circuits. This has the advantage that a fixed relation exists so that ageing effects, mainly of the resonant circuits in the responder whereby the resonance frequency moves away from the original frequency, have little influence on the detection accuracy. In an easy way a closed loop system is set up.

The mentioned British patent No. 1,187,130 shows a system wherein use is made of frequency dividers, one in the responder and one between the power oscillator and the detector. Instead of dividers multipliers may be used. This has been shown in FIG. 2 of the U.S. Pat. No. 4,068,232.

It is an object of the present invention to simplify the receiver and transmitter section of the system.

According to the present invention a detection system is provided which is characterized in that a frequency changer is connected between the oscillator and the transmitter for producing a second signal having a second frequency which is related mathematically to the first frequency, that the first resonant circuit is tuned to the second frequency and the second resonant circuit is tuned to the first frequency and that the detector comprises a comparator connected to the oscillator for comparing a signal from the oscillator having the first frequency with a signal from the receiver having substantially the first frequency for producing an output if the two frequencies are substantially the same.

The advantage of this system is that one unit in the system is standard, namely the receiver. Once having chosen the frequency f of the oscillator in the system the receiver is always tuned to this frequency f, while the multiplying or dividing factor n is still free to choose. This means that several systems may be set up with own transmitter sections based on the factor n and responders belonging to them.

The detection system in accordance with the present invention is a closed loop system in so far that the frequency of the signal which is received by the receiver from the responder circuit should always be substantially the same as the originally generated first frequency in the oscillator of the apparatus because of the frequency translation in the responder circuit. The first and second frequencies are related mathematically in that one is a multiple or sub-multiple of the other. The system may operate up to 10 MHz or higher but in view of the problems of interference with presently used broadcast transmitting frequencies relatively low frequencies up to 150 KHz are preferred because apart from one or two specialized broadcasting frequencies the band is relatively free from other radio interference and also the lower the frequency the less is the body shielding effect and thereby the chances of detection is greater.

In one embodiment of the invention the responder circuit in the tag halves the frequency transmitted which transmitted frequency is double the originally generated signal. Such a responder circuit may comprise a first resonant circuit tuned to the first frequency, a divide by two circuit and a second resonant circuit tuned to the divided frequency. The divide by two circuit may conveniently comprise a D-type flip-flop. By making the D-type flip-flop from insulated gate components such as CMOS devices then the need for a power supply in the form of a battery in the tag may be avoided as the D-type flip-flop may be self powered by energy received from the transmitted signal.

The responder circuit may comprise means for doubling the first frequency such means for example comprising a diode. The transmitted signal may be a continuous wave (CW) but in the interests of compactness of the transmitter and economy of electrical power, it is preferred that the transmitted signal be bursts of signal having the first frequency.

By the responder circuit simply multiplying or dividing the transmitted signal so that the frequency of the signal received by the receiver corresponds substantially to that as originally generated, any drift in the originally generated signal should not affect the operation of the system because each change of frequency is an arithmetic operation either on the signal itself or a signal derived from it. Thus unlike some known systems in which the responder circuit includes a separate oscillator with its own tuning elements so that frequency drift in the responder is unrelated to the frequency of the signal transmitted to the responder circuit.

Further, by sweeping the originally generated signal either side of the nominal frequency the effects of ageing of the responder circuit can be mitigated further because by means of the closed loop arrangement the received signal if not the same as the originally generated frequency will be close to it and will inevitably be picked up by the sweeping oscillatory circuit.

The transmitting antenna is conveniently a tuned loop antenna. If two antennae are provided and are arranged inclined relative to one another for example at 90° to each other, the signal to be transmitted is preferably supplied to the antennae alternately so that only one antenna at a time is transmitting a signal and thereby there is no risk of components of the fields of the aerials cancelling each other out and producing dead zones as is the case with parallel connected aerials.

In order to avoid the risk of the system responding inadvertently to spurious noise a delay filter is provided so that the actuation of an alarm is delayed for a fraction of a second.

Figure 2:
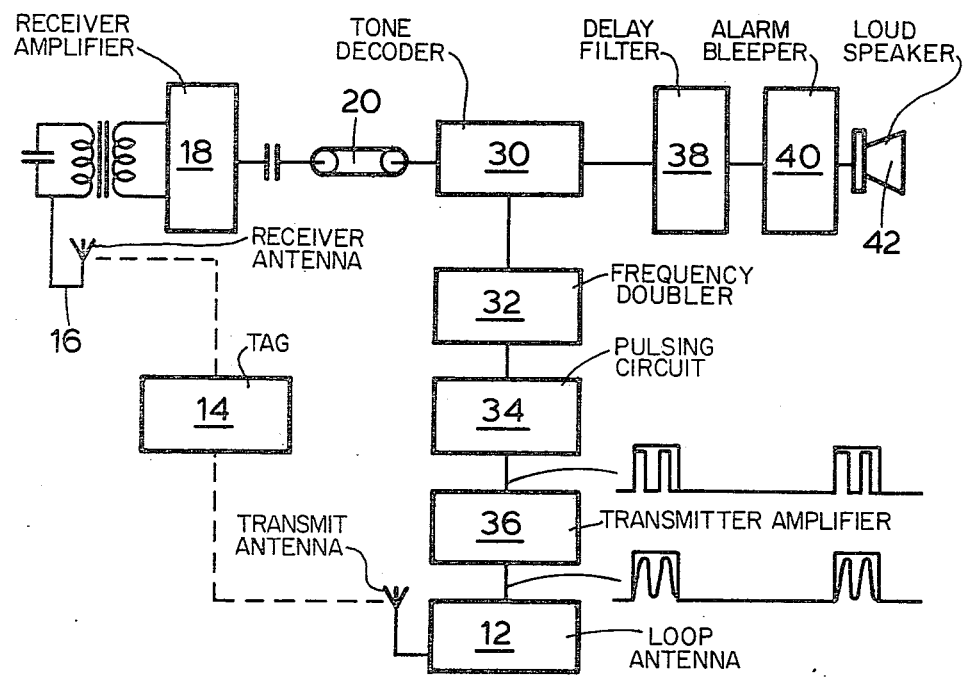
Figure 3:
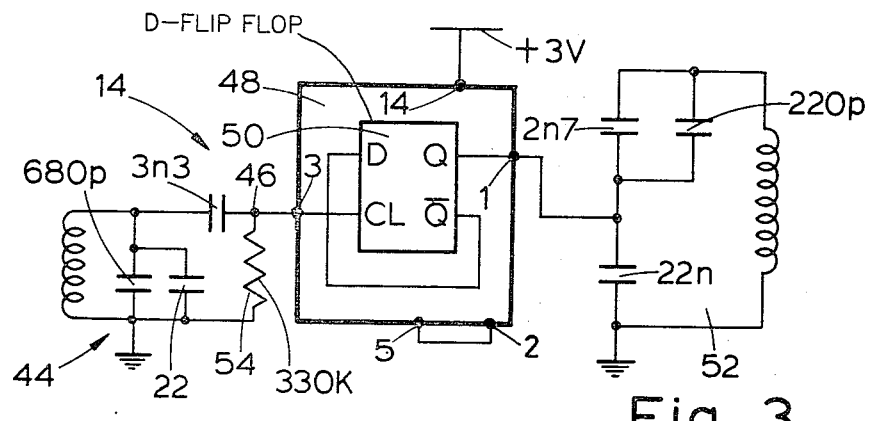
Figure 4:
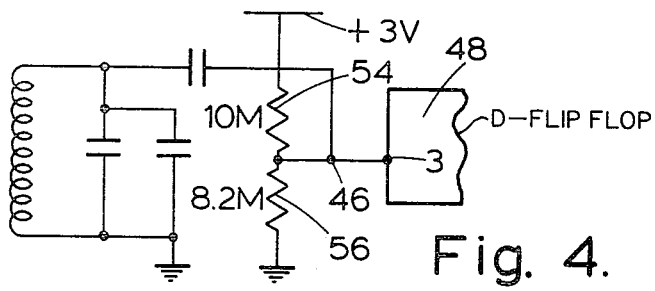
Figure 9:
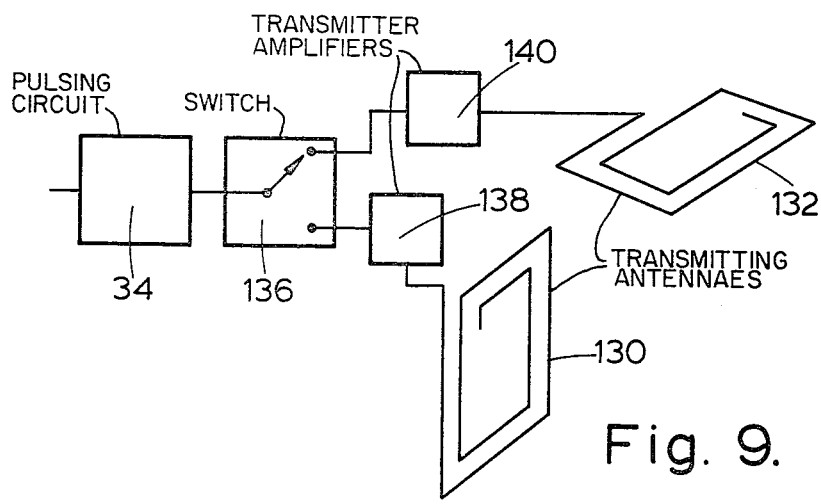
Figure 5:
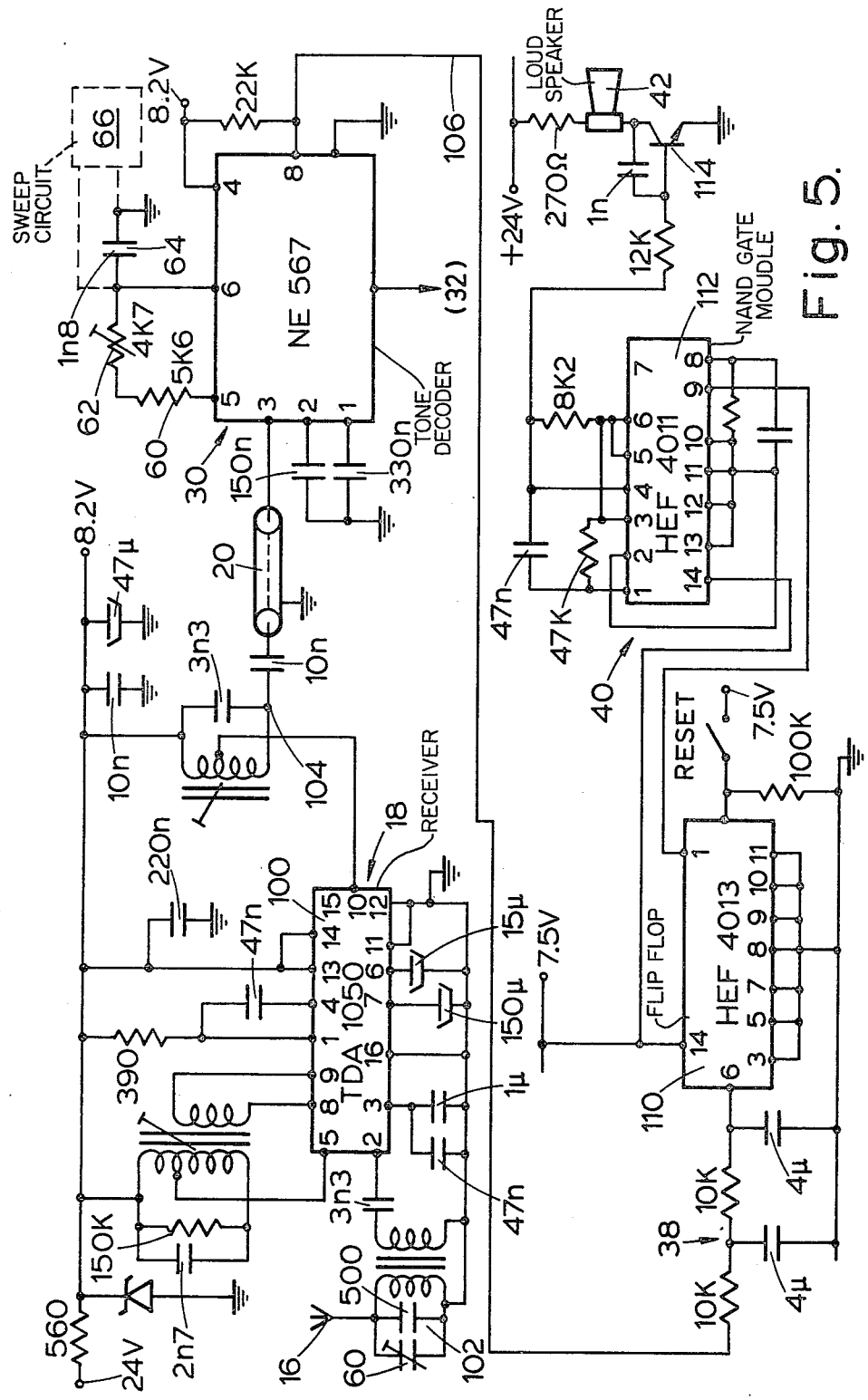
Figure 6:
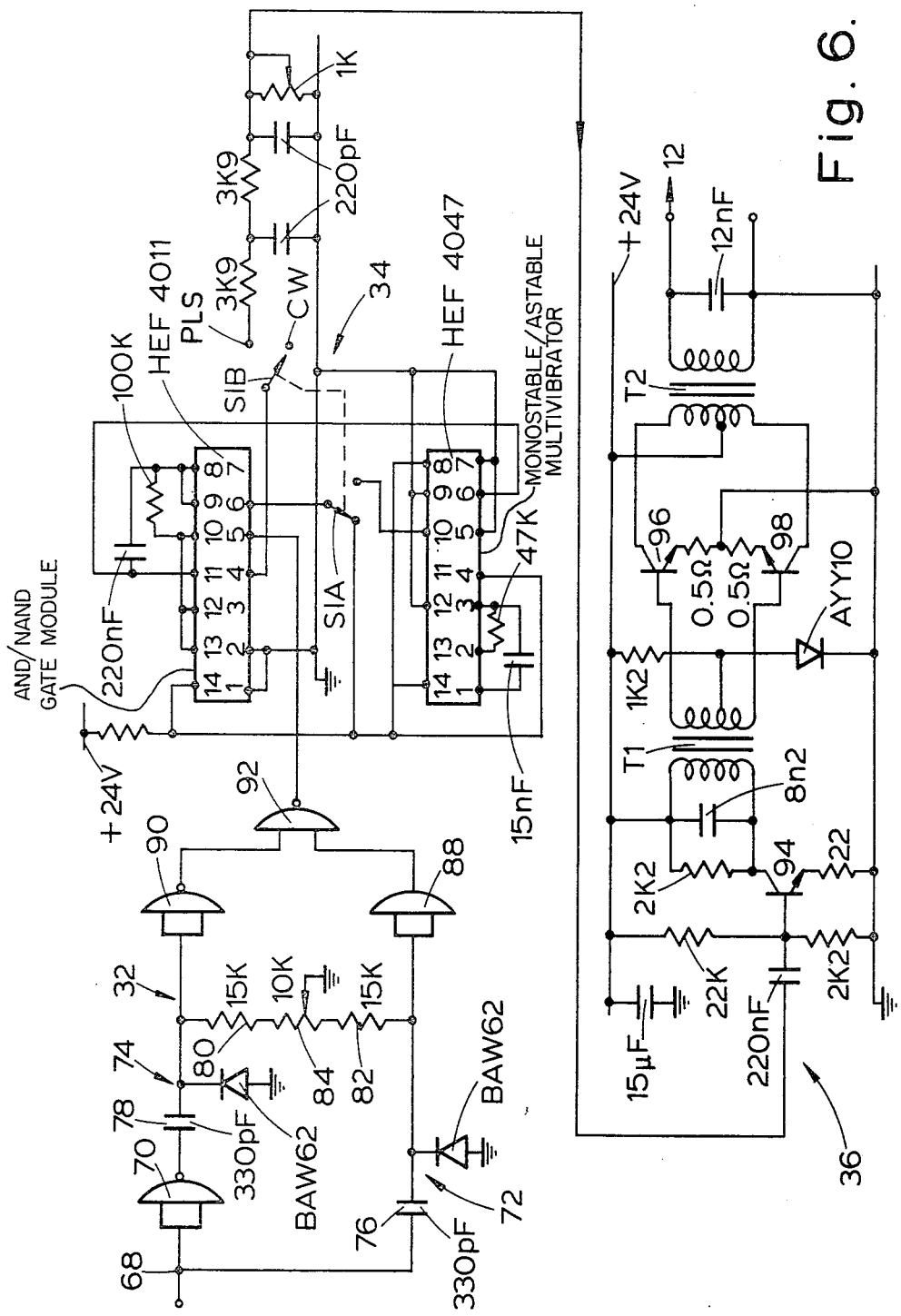
Figure 7:
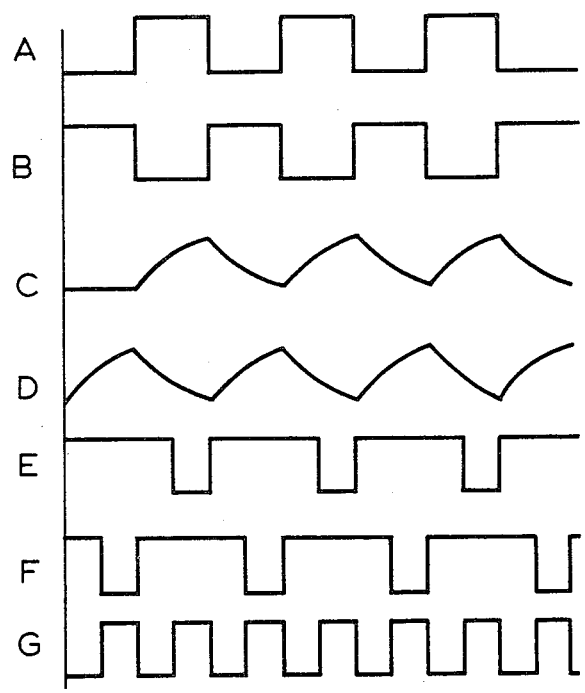
Figure 8:
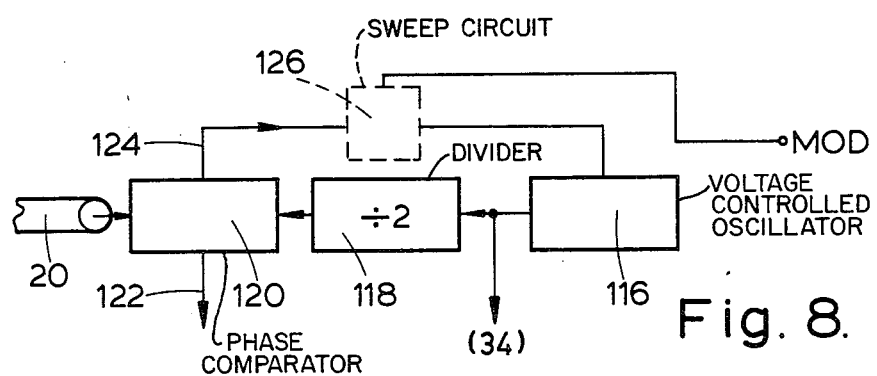

The present invention will now be described, by way of example, with reference to the accompanying drawings, therein:

FIG. 1 is a diagrammatic overall view of a merchandise security system,

FIG. 2 is a block schematic circuit diagram of one embodiment of a merchandise security system in accordance with the present invention, FIG. 3 is a circuit diagram of the responder circuit in the tag, FIG. 4 is a modification of the circuit shown in FIG. 3, FIG. 5 is a schematic circuit diagram of some of the circuit elements shown in FIG. 2, FIG. 6 is a schematic circuit diagram of other of the circuit elements shown in FIG. 2, FIG. 7 comprises a plurality of waveform diagrams which facilitate the understanding of the operation of the frequency doubler 32 shown in FIG. 6, FIG. 8 is a block schematic circuit diagram of one variant of the circuit shown in FIG. 2, and FIG. 9 is a schematic circuit diagram of an arrangement for switching between two aerials inclined relative to one another.

Referring initially to FIG. 1 a signal having a first frequency is generated in a unit 10 and transmitted via an antenna 12. If an article having a tag 14 with a responder circuit therein is taken past the transmitting area, the responder circuit produces a signal having a second frequency which is a multiple or sub-multiple of the first frequency and which is received by a receiver aerial 16 and conveyed to a receiver amplifier 18. The receiver amplifier 18 is connected via a cable 20 back to the unit 10 where the signal is compared with a generated signal having the same frequency as the second frequency and an alarm signal is produced which is sent to an alarm device 22. The alarm device 22 may take any suitable form such as an acoustic device, light emitting device or door operating means to prevent a person removing the article bearing the tag 14 from the store.

In the embodiment of the present invention shown in FIG. 2, a pulse signal having a one to one mark/space ratio and a frequency of 66.95 KHz is produced in a tone decoder 30. The frequency of the signal from the tone decoder 30 is doubled in a frequency doubler 32 to a frequency of 133.9 KHz and is pulsed in a pulsing circuit 34. The 133.9 KHz signal applied to the pulsing circuit 34 is formed into pulses or bursts of 133.9 KHz signal the mark to space ratio of the pulses being approximately 1:10. In the illustrated example the mark is 2 mS and the space 33 mS. The pulses are transmitted via a transmitter amplifier 36 and a loop antenna 12 to a tag 14 having a responder circuit. The tag 14 essentially divides the frequency of the pulses of 133.9 KHz signal by two to form pulses of 66.95 KHz signal which are picked up by the receiver antenna 16 and amplified by the receiver 18. The amplified pulses of signal at a frequency of 66.95 KHz are conveyed by the cable 20 to the tone decoder 30 wherein it is compared with the originally produced 66.95 KHz signal. As the signals are identical then an alarm signal is sent via a delay filter 38 to an alarm device. In the case of the illustrated embodiment the alarm device comprises an alarm bleeper 40 which is connected to a loud-speaker 42.

Although the tone decoder 30 generates a fixed frequency it may be arranged to sweep about a center frequency of 66.95 KHz thereby countering the effect of any ageing in the circuit of the tag because even if there is any slight frequency shift within the system, as the tag divides the originally transmitted signal by two then it will almost inevitably be in the sweep range of the frequency of the tone decoder 30 so that an alarm signal may be produced. By operating at the frequencies of 66.95 KHz and 133.9 KHz the effects of body shielding are minimized and also the risk of interference by other radio sources is substantially avoided.

FIG. 3 is a schematic diagram partially in block form showing an embodiment of a responder circuit incorporated in tag 14 for use with the arrangement of FIG. 2. The circuit comprises a first L.C. resonant circuit 44 tuned to the first frequency of 133.9 KHz. The output 46 of the resonant circuit is connected to a D-type flip-flop 50 based on an HEF 4013 integrated circuit 48 which is connected as a divide by two circuit. The output from the D-type flip-flop 50 having a frequency of 66.95 KHz is connected to a L.C. resonant circuit 52 for transmission to a receiver. In the illustrated embodiment the point 46 in the circuit is connected to one side of a power supply (not shown) by means of a resistor 54 having a value of 330K Ohms. By using the resistor 54 the current drain from the circuit in its non-actuated state is of the order of microamps but the effective range of the security system is of the order of 1 meter, that is provided the tag is within 1 meter of the transmitting and receiving antennae then the responder circuit can operate. The value of other components of the responder circuit are as shown.

FIG. 4 shows a modification of the circuit illustrated in FIG. 3. In FIG. 4 the point 46 connected to pin 3 of the integrated circuit is connected to a tap of a potentiometer connected across the power supply +3 volts. The potentiometer comprises two fixed resistors 54, 56 having respectively a value of 10 M Ohms and 82. M Ohms. The effect of connecting the point 46 to the tap of the potentiometer is to increase the bias and hence the current drain by the circuit but at the same time the pick-up range of the tag is increased from 1 meter to substantially 3 meters.

In the foregoing description of the tag 14 and in the following description the numerals used inside a rectangle representing an integrated circuit correspond to the pin numbers of the integrated circuit.

The schematic circuit diagrams of FIG. 5 and 6 show one practical embodiment of the static apparatus shown in FIG. 2. The values of the various components are as shown. The tone decoder 30 (FIG. 5) is based on a Signetics NE 567 integrated circuit, the frequency of 66.95 KHz being set by means of a fixed resistor 60, a preset resistor 62 and a capacitor 64. If it is desired to sweep the frequency of the tone decoder then wobbling or sweep circuit means 66, shown in broken lines, is connected across the capacitor 64. The frequency doubler 32 (FIG. 6) uses an integrated circuit HEF 4011 which comprises a plurality of NAND gates. The incoming signal shown in diagram A of FIG. 7 is applied to two paths. One of the paths comprises a NAND gate 70 which is connected as an inverter the output waveform of which is shown by diagram B (FIG. 7). The waveforms A and B which are phase opposition to each other are applied to capacitor charging circuits 72 and 74, respectively. The circuits 72, 74 include capacitors 76, 78, respectively, which are charged during the periods when the respective signals are at a high level and discharge exponentially when the respective signals are at a low level. The charge and discharge cycle of the capacitors 78, 76 are shown by the diagrams C, D (FIG. 7), respectively. The waveforms shown in diagrams C and D are applied to the opposite ends of a potential divider network comprising two fixed resistors 80 and 82 and a potentiometer 84 connected between the two resistors 80, 82. The tap 86 of the potentiometer 84 is connected to ground and controls the mark/space ratio of the frequency doubled signal produced subsequently. In the illustrated embodiment the frequency doubled signal has a mark/space ratio of 1 to 1. The signals shown by the waveforms D and C are applied to NAND gates 88, 90, respectively which are connected as inverters and the output waveforms each comprise pulse signals, waveforms F, E, (FIG. 7) respectively which are applied to the inputs of a further NAND gate 92 to produce an output frequency doubled signal of 133.9 KHz and having a marked space ratio of 1 to 1, diagram G (FIG. 7).

This signal is supplied to the pulsing circuit 34 (FIG. 6) which comprises two integrated circuits one and NAND gate module HEF 4011 and a monostable/astable multivibrator based on a circuit module HEF 4047. The exact operation of the pulsing circuit will not be described in detail as it will be evident to a man skilled in this art having regard to the disclosure in reference books concerning these two integrated circuits. The pulsing circuit may operate in one of two modes, the particular mode being selected by a switch having contacts S1A and S1B. In one position of these contacts the circuit operates in a pulsing mode (PULSE) so that the output signal has for example a mark to space ratio of 2 to 33 so that pulses having a frequency of 133.9 KHz are sent for 2 milliseconds in every 35 milliseconds. In the alternative mode the switch contacts can be set to continuous wave (CW) so that the output from the pulsing circuit is a continuous wave. The output of the pulsing circuit includes a simple R.C. filter circuit as shown.

The transistor amplifier 36 (FIG. 6) is substantially conventional and therefore will not be described in detail. The driver circuit is based on a BFY 51 transistor 94 and the driver circuit is coupled by a transformer T1 to a push-pull output stage comprising transistors 96, 98 of type BDX 35. An output transformer T2 is matched to a tuned loop antenna 12. When the pulsing circuit 34 is operating in a pulsing mode the output peak power of the transmitter is of the order of 20 watts.

The receiver 18 (FIG. 5) is a substantially conventional receiver based on an integrated circuit module 100 type TDA 1050. Since the receiver 18 is conventional it will not be described in detail. A signal from the responder circuit in the tag comprises pulses or bursts of frequency at 66.95 KHz which are received by the antenna 16 which is coupled to a tuned circuit 102.

An output 104 of the receiver is connected by the cable 20 back to the tone decoder 30. In the tone decoder the 66.95 KHz bursts of signal are compared with the frequency originally generated in the tone decoder and as they are substantially the same then an output is produced on the line 106. The signal on the line 106 will be a logic signal having either a high or a low level corresponding to the presence or absence of a tag within the range of the transmitting antenna 12. The signal on the line 106 first passes to a R.C. delay filter 38 (FIG. 5) and subsequently actuates the alarm bleeper 40 (FIG. 5) which comprises a flip-flop circuit 110 based on an integrated circuit HEF 4013 and a quadruple two input NAND gate module 112 based on an integrated circuit type HEF 4011. The output from the NAND gate element 112 is supplied to a driver circuit for the loudspeaker 42. This driver circuit includes a transistor 114, type BFY 51 having the loudspeaker 42 in its collector circuit.

The use of a bleeper and loudspeaker are purely illustrative because other forms of alarm device may be used as indicated above.

Various modifications may be made to the system shown in FIG. 2 and in one of these the frequency doubler 32 may be omitted and pulsed oscillations at a frequency of 66.95 KHz are supplied to the transmitter amplifier which has at its first stage a frequency doubler which supplies its output to the driver stage of the transmitter amplifier. In another modification shown in FIG. 8 of the drawings, the frequency doubler 32 is omitted and a voltage controlled oscillator 116 generates a signal having a frequency of 133.9 KHz which is supplied to the pulsing circuit 34 and thence to the transmitter amplifier 36.

The signal at 133.9 KHz is also supplied to a divide by two circuit 118 and the output of this circuit having a frequency of 66.95 kHz is supplied to a phase comparator 120. The line 20 from the receiver 18 is also connected to the phase comparator 120 and assuming that the signal on the line 20 is of the same phase and frequency as that from the divide by two circuit 118 an alarm signal is produced on the line 122.

Any error in phase of the two signals is conveyed via a line 124 to the voltage controlled oscillator 116 and is used to adjust the frequency thereof. If it is desired to sweep the waveform received from the receiver then a means 126 for sweeping the frequency is connected in the error line 124.

In an alternative, non-illustrated embodiment of the invention to that shown in FIG. 2, the tone decoder generates a frequency of 133.9 KHz and this is supplied to a divide by two circuit which produces an output having a frequency of 66.95 KHz. This latter signal is pulsed in a pulsing circuit and supplied via a transmitter amplifier to a transmitting antenna. In this non-illustrated embodiment the tag has a first resonant circuit tuned to the frequency of 66.95 KHz and the output of the first resonant circuit is connected to a frequency doubler which produces an output frequency of 133.9 KHz which is supplied to a second resonant circuit. The pulses or bursts of signal having a frequency of 133.9 KHz are relayed by a receiver and a cable back to the tone decoder where the received signal is compared with the originally generated signal in the tone decoder and if they are substantially the same then a signal is sent via a delay filter to an alarm system comprising a bleeper and a loudspeaker.

Although the division of the tone decoder signal by two and its multiplication by two have been described in the various examples it should be understood that these dividers and multipliers are purely exemplary and that other values may be used. In fact in a development of the system for example for use in a departmental store, several systems may be set up based on the same tone decoder frequency but in one department the frequency may be multiplied by two as in FIG. 2, in another department the system may multiply the frequency by three and in yet a further department the frequency is multiplied by four. The tags associated with each of the departments will include divide by two, divide by three and divide by four circuits respectively. Thus the movements of goods from one department to a next can be monitored and if shoplifting is suspected then the individual can be kept under surveillance. At the final exit of the store the system there would comprise a single tone decoder the output of which is supplied to three parallel paths each of which multiplies the tone decoder frequency by two, three or four. Each of these signals after pulsing is transmitted by respective transmitting antennae. The system at this main exit will only require one receiver tuned to the frequency of the tone decoder because a tag having a divide by two circuit in it will respond to a tone decoder signal which has been multiplied by two, a tag with a divide by three circuit in it will respond to a tone decoder signal which has been multiplied by three and a tag having a divide by four circuit in it will respond to a signal corresponding to a tone decoder signal multiplied by four.

FIG. 9 illustrates in block schematic form a part of the security system for connection to at least two transmitting antennae 130, 132 arranged at an angle, such as 90°, relative one to the other. The output from the pulsing circuit 34 is connected to a change-over switch 136 which switches the pulses of the frequency from the circuit 34 alternately to transmitter amplifiers 138 and 140 which are connected to respective loop antennae 130, 132. By means of this arrangement only one antenna at a time is transmitting a signal so that the risk of the occurrence of dead zones which will occur with parallel fed antennae will not occur.

In the system of the present invention the responder circuit in the tag is an active circuit and the coupling between the tags and the antenna is electromagnetic and thereby unaffected by body shielding. By using insulated gate MOS circuitry in the tag, the need for a separate battery supply may be avoided as the divider or multiplier circuit may be self powered from the energy of the received signal.

If desired the signal transmitted from the antenna 12 may be coded or modulated and the responder circuit in the tag 14 may include a decoder or demodulator. Alternatively the tag 12 may include an encoder and the receiver 18 a decoder.

Such an encoder may include a PROM which is programmed to produce a binary coded signal in response to the application of the pulses or the bursts of signal having the second frequency.

Although the present invention has been described with reference to merchandise security systems, it could be used in other types of signalling and security systems.

Accordingly the term "merchandise security system" is to be interpreted broadly to cover any suitable application wherein the presence of a responder having means for translating a first frequency to a second frequency can be used to operate an alarm or control access.

What is claimed is:

1. A detection system comprising an oscillator for generating a signal having a first frequency, a transmitter having an aerial for transmitting an interrogating signal, a responder movable relative to the aerial having a first resonant circuit for detecting the interrogating signal, having a second resonant circuit for transmitting a reply signal, the resonant circuits being tuned to frequencies mathematically related to each other and being interconnected by a coupling device which activates the second resonant circuit in response to the detection of the interrogating signal, the system further comprising a receiver having an aerial for receiving the reply signal, a detector coupled to a receiver output and an indicator coupled to a detector output and signalling the presence of a responder characterized in that a frequency changer is connected between the oscillator and the transmitter for producing as said interrogating signal a second signal having a second frequency which is related mathematically to the first frequency, that the first resonant circuit is tuned to the second frequency and the second resonant circuit is tuned to the first frequency and that the detector comprises a comparator connected to the oscillator for comparing a signal from the oscillator having the first frequency with a signal from the receiver having substantially the first frequency for producing an output if the two frequencies are substantially the same.

2. A system as claimed in claim 1, characterized in that a pulsing circuit is coupled to the transmitter for producing said second signal in bursts.

3. A system as claimed in claim 1 or in claim 2, characterized in that the frequency changer comprises a multiplier circuit for multiplying the first frequency by a factor n and the coupling device in the responder comprises a frequency divider having a divisor of 1/n.

4. A system as claimed in claim 1 or in claim 2, characterized in that the frequency changer comprises a frequency divider having a divisor of 1/n and the coupling device in the responder comprises a multiplier circuit for multiplying the signal from the first resonant circuit with a factor n.

5. A system as claimed in claim 1 or in claim 2, the aerial of the transmitter comprising two antennae arranged at an angle to each other, characterized in that a switching device is provided coupling the signal having the second frequency alternately to each one of the antennae.

6. A system as claimed in claim 1 or in claim 2, characterized in that the oscillator generates a signal having a variable frequency sweeping in a band centered on the first frequency.

7. A system as claimed in claim 1 or in claim 2, characterized in that the responder is embodied in a tag.

8. A system as claimed in claim 1 or in claim 2, characterized in that the coupling device of the responder includes an encoder and the detector coupled to the receiver output includes a decoder.

9. A system as claimed in claim 1 or in claim 2, characterized in that the transmitter includes an encoder and the coupling device of the responder includes a decoder.

* * * * *